United States Patent
Singh et al.

(10) Patent No.: US 12,394,344 B1
(45) Date of Patent: Aug. 19, 2025

(54) ADAPTIVE BRIGHTNESS DISPLAY FOR RECORDING DEVICE

(71) Applicant: Axon Enterprise, Inc., Scottsdale, AZ (US)

(72) Inventors: Harshwinder Singh, Sammamish, WA (US); James Norton Reitz, Bainbridge Island, WA (US); Anh The Pham, Ho Chi Minh (VN); Phu Thanh Bao Tran, Ho Chi Minh (VN); Khanh Minh Nguyen, Ho Chi Minh (VN); Nguyen Van Nguyen, Ha Noi (VN)

(73) Assignee: Axon Enterprise, Inc., Scottsdale, AZ (US)

( * ) Notice: Subject to any disclaimer, the term of this patent is extended or adjusted under 35 U.S.C. 154(b) by 385 days.

(21) Appl. No.: 17/970,526

(22) Filed: Oct. 20, 2022

Related U.S. Application Data

(60) Provisional application No. 63/270,051, filed on Oct. 20, 2021.

(51) Int. Cl.
*G09G 3/20* (2006.01)
*G01J 1/42* (2006.01)
(Continued)

(52) U.S. Cl.
CPC .............. *G09G 3/20* (2013.01); *G01J 1/4204* (2013.01); *H04N 9/79* (2013.01); *H04N 23/51* (2023.01);
(Continued)

(58) Field of Classification Search
None
See application file for complete search history.

(56) References Cited

U.S. PATENT DOCUMENTS 9,571,741 B1 * 2/2017 Ramsay ............... H04N 23/681
9,922,387 B1 * 3/2018 Newman ............ H04N 1/32128
(Continued)

FOREIGN PATENT DOCUMENTS

CN          104065862 A  *  9/2014
CN          205792751 U  * 12/2016
(Continued)

OTHER PUBLICATIONS

Axon Enterprise, Inc., "Axon Body 3 Camera User Manual, Models AX1023, AX1024, AX1025, Document Revision: E", Sep. 2021.
(Continued)

*Primary Examiner* — Ricky Chin
(74) *Attorney, Agent, or Firm* — Andrew Terajewicz; Andrew Graham

(57) ABSTRACT

A recording device automatically adjusts a brightness of a display integrated with the recording device. The recording device may be a body-worn camera. The display may comprise one or more light-emitting diodes. The brightness may be adjusted in accordance with an ambient lighting environment in which the recording device is located. The display may be oriented in a direction away from a user on which the recording device is mounted. The brightness may be adjusted for multiple displays integrated with the recording device. The display may be oriented in a different direction in which the ambient lighting environment is detected by an ambient light sensor integrated with the recording device.

20 Claims, 4 Drawing Sheets

(51) Int. Cl.
  *H04N 9/79* (2006.01)
  *H04N 23/51* (2023.01)
  *H04N 23/54* (2023.01)
  *H04N 23/56* (2023.01)
  *H04N 23/667* (2023.01)

(52) U.S. Cl.
  CPC .............. *H04N 23/54* (2023.01); *H04N 23/56* (2023.01); *H04N 23/667* (2023.01); *G09G 2320/0626* (2013.01)

(56) References Cited

U.S. PATENT DOCUMENTS

| | | | |
|---|---|---|---|
| 9,934,758 B1* | 4/2018 | Morat | G09G 5/10 |
| 10,873,705 B2* | 12/2020 | Takao | G03B 13/10 |
| 11,375,121 B2* | 6/2022 | McCauley | H04N 23/53 |
| 2013/0088523 A1* | 4/2013 | Wu | G09G 3/3611 |
| | | | 345/690 |
| 2014/0063049 A1* | 3/2014 | Armstrong-Muntner | |
| | | | H04N 23/611 |
| | | | 345/619 |
| 2016/0309064 A1* | 10/2016 | Woodman | G03B 17/08 |
| 2017/0339390 A1* | 11/2017 | Doshi | H04N 9/8042 |
| 2018/0012560 A1* | 1/2018 | Yuan | G09G 5/10 |
| 2018/0046423 A1* | 2/2018 | Abraham | G09G 5/30 |
| 2018/0218710 A1* | 8/2018 | Park | G09G 5/00 |
| 2018/0274974 A1* | 9/2018 | Wang | G09G 3/20 |
| 2019/0289173 A1* | 9/2019 | Campbell | H04N 23/57 |
| 2020/0045214 A1* | 2/2020 | Zhou | H04N 23/45 |
| 2020/0105182 A1* | 4/2020 | Koo | G09G 3/3625 |
| 2021/0360157 A1* | 11/2021 | Veit | H04N 23/71 |
| 2021/0392245 A1* | 12/2021 | Yui | H04N 23/698 |
| 2021/0397751 A1* | 12/2021 | Iyer | G06F 3/04842 |
| 2022/0030152 A1* | 1/2022 | Guérin | G06T 5/70 |
| 2022/0208142 A1* | 6/2022 | Yang | H04N 23/74 |
| 2022/0410797 A1* | 12/2022 | Spall | B60R 13/10 |
| 2023/0007159 A1* | 1/2023 | Al Majid | H04N 23/71 |
| 2023/0073359 A1* | 3/2023 | Kukuk | F41H 13/00 |
| 2024/0187715 A1* | 6/2024 | Dorado | H04N 5/2621 |
| 2024/0355787 A1* | 10/2024 | Lestoquoy | H10H 20/855 |

FOREIGN PATENT DOCUMENTS

| | | | |
|---|---|---|---|
| DE | 112017001625 T5 * | 12/2018 | ............ G03B 17/04 |
| JP | 2013127574 A * | 6/2013 | |

OTHER PUBLICATIONS

Axon Enterprise, Inc., "Axon Body 3 Camera User Manual, Models AX1021 and AX1023, Document Revision: Draft B", Jun. 2019.

* cited by examiner

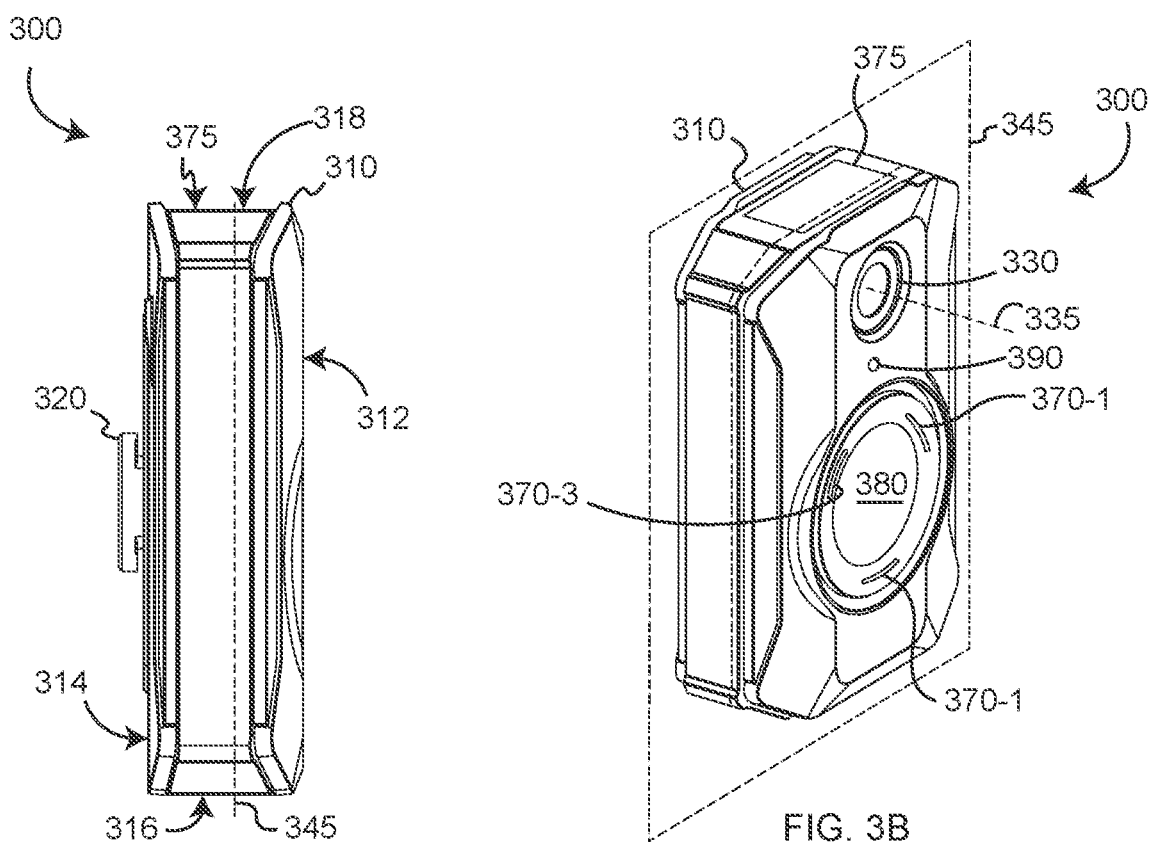
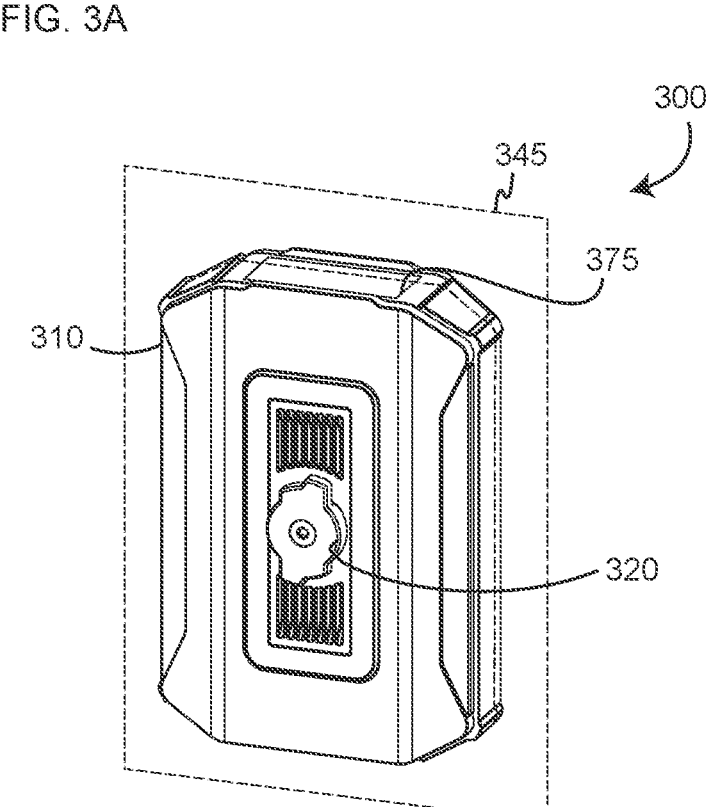
FIG. 3A
FIG. 3B
FIG. 3C

ADAPTIVE BRIGHTNESS DISPLAY FOR RECORDING DEVICE

FIELD OF INVENTION

Embodiments of the present invention relate to recording devices comprising adaptive brightness displays.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

FIG. 3A is a side view of an imaging device with adaptive display brightness in accordance with various embodiments described herein;

FIG. 3B is a front perspective view of the imaging device of FIG. 3A in accordance with various embodiments described herein;

FIG. 3C is a rear perspective view of the imaging device of FIG. 3A in accordance with various embodiments described herein;

Figure 1:
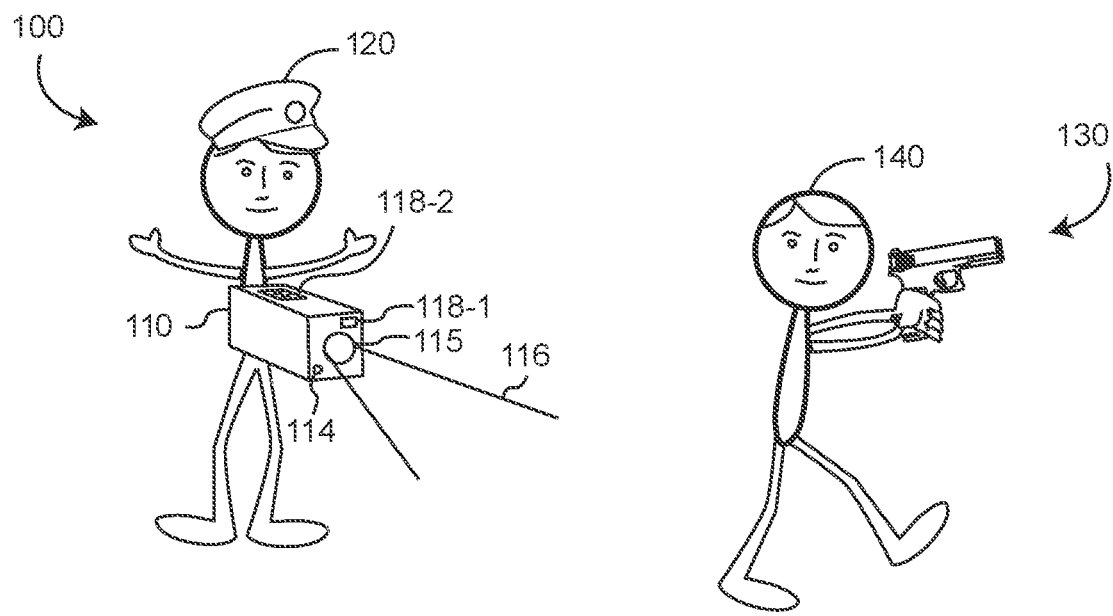
FIG. 1 is a diagram of an imaging device at an incident in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of various embodiments refers to the accompanying drawings, which show various embodiments by way of illustration. While these various embodiments are described in sufficient detail to enable those skilled in the art to practice the disclosure, it should be understood that other embodiments may be realized, and that logical and physical changes may be made without departing from the spirit and scope of the disclosure. Thus, the detailed description is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In various embodiments, an incident (or similar terms and phrases, such as an emergency) refers to human or animal activities and to a period of time while these activities take place. Incidents include, for example, formation of agreements, transactions, negotiations, discussions, ceremonies, meetings, medical procedures, sporting events, crimes, attempted crimes, disagreements, assaults, conflicts, discoveries, research, investigations, surveillance, and/or the like. Incidents may include consequences including changes to property such as improvements, repairs, construction, production, manufacture, growth, harvesting, damage, loss, theft, burglary, arson, goods damaged in shipment, conditions of real estate, and/or conditions of agricultural and forestry property. An incident may include damage to property and/or injury to persons or animals. Damage to property or injury to persons or animals may be accidental or brought on by the action or failure to act of one or more persons. Incidents include information valuable for risk management, insurance, claims, achievements, sports records, news reporting, entertainment, and/or the like.

One or more incident responders may respond or help before, during, or after an incident. For example, in response to an incident including a fire (e.g., burning building, house fire, etc.), incident responders may include a law enforcement officer, a firefighter, a medical responder (e.g., an emergency medical technician (EMT), a paramedic, an ambulance technician, etc.). As a further example, in response to an incident including a crime or attempted crime, incident responders may include one or more law enforcement officers. As a further example, in response to an incident including a covert military operation, incident responders may include one or more military personnel.

Information (e.g., data, audio, visual, location, environmental, etc.) gathered about an incident may describe the incident. Information may include facts about the activities of the incident, consequences of the incident, time of the incident, location of the incident, and identity of humans, animals, or objects related to the incident. Information about an incident may form a report of an incident (e.g., an incident report). Information about the incident may be gathered before, during, or after an incident. Incident information may be recorded (e.g., audio, video) to document an incident at the time of occurrence.

Recording incident information captures at least some of the information about the incident. Recording further protects against loss of information, for example, by physical loss or by faulty human memory. For example, incident responders may capture audio and/or visual information of the incident. The audio and/or visual information may be captured by a recording device, such as, for example, a body-worn camera, a smartphone, an internet of things (IoT) device, a vehicle-mounted camera, a surveillance camera, and/or any other recording device discussed herein. Recording the incident information may include storing the information in a memory of the recording device.

Recording devices may capture incident information of a scene from a fixed position (e.g., a fixed field of view, a fixed vantage point, etc.). For example, a body-worn camera may capture a fixed field of view from the body of the incident responder, a vehicle-mounted camera may capture a fixed field of view from the vehicle, a hallway-mounted camera may capture a fixed position from the hallway, etc.

Recording devices may provide information to an incident responder via a display. For example, a body-worn camera may provide information to the person wearing the body-worn camera via a display, a vehicle-mounted camera may provide information to the person operating the vehicle via a display, etc. Information provided via the display to the incident responder may comprise wireless connectivity strength, remaining battery capacity, recording status, etc.

Recording devices may provide information to a person at an incident via a display. The person at the incident may include a person at the incident, other than the incident responder. For example, at an incident including a crime or an attempted crime, a recording device may provide information to a suspect via the display. The information may comprise non-video information. The information may be separate from video data captured by the recording device, if any. The information may comprise status information regarding an operating state of the recording device. The information may comprise configuration information regarding a setting of the recording device. For example, information provided via the display to a person at the incident may comprise a recording status, de-escalation progress, remaining time, etc.

In various embodiments, a brightness of a display of a recording device may be adapted according to an ambient light level of the scene. The brightness of the display may directly correlate with the ambient light level of the scene. For example, when ambient light levels are high (e.g., in daylight, in a well-lit room, etc.) the brightness of the display may be increased to improve readability (e.g., visibility) of information provided by the display. When ambient light levels are low (e.g., during night, in a cave, etc.) the brightness of the display may be decreased to reduce impairment of night vision and/or to reduce a likelihood of detection (e.g., during a covert operation). The brightness of the display may indirectly correlate with the ambient light level of the scene. For example, when ambient light levels are high, the brightness of the display may be decreased (e.g., to conserve power). When ambient light levels are low, the brightness of the display may be increased.

In various embodiments, and with reference to FIG. 1, a recording device at an incident is disclosed. The recording device may be configured to capture incident information from a fixed field of view. The recording device may be configured to be worn on by an incident responder (e.g., as a body-worn camera on a police officer). The recording device may be oriented (e.g., pointed, aimed, etc.) toward a scene to record incident information to document the incident at the time of occurrence. In various embodiments, and as discussed further herein, the recording device may be configured to provide a plurality of displays, each display configured to provide information in different directions.

In various embodiments, and with reference to FIG. 1, a recording device 110 at an incident 100 is disclosed. Recording device 110 may be worn by an incident responder, such as police officer 120. Recording device 110 may comprise an optical element, such as a lens 115, that is aimed at a scene of interest, such as scene 130. Scene 130 may include a suspect, such as suspect 140. Recording device 110 may comprise a field of view (e.g., field of capture, etc.), such as field of view 116. Field of view 116 may correspond with a direction toward which lens 115 is aimed. For example, in accordance with lens 115 aimed toward scene 130, field of capture 116 may comprise a portion of scene 130, such as a portion of, or all of, suspect 140.

In various embodiments, a recording device may comprise a display. A display may comprise a device configured to provide visual information. The visual information may include textual information, non-textual information, or a combination of textual information and non-textual information. For example, a screen may be configured to provide textual information and non-textual information, and an indicator may be configured to provide only non-textual information. A screen may comprise a complex display, such as a liquid crystal display (LCD), light emitting diode (LED) display, organic light emitting diode (OLED) display, active-matrix organic light emitting diode (AMOLED) display, micro light emitting diode (microLED) display, electroluminescent display (ELD), plasma display panel (PDP) display), or any other display configured to provide high resolution visual information. An indicator (e.g., lamp) may comprise a simple display, such as a light emitting diode (LED), a xenon flash tube, or any other display configured to provide low resolution visual information. The LED may be a direct in-line package (DIP) LED, a surface mounted device (SMD) LED, or a chip on board (COB) LED. The simple display may comprise one or more individual LEDs configured to individually present visual information to a user. Unlike a complex display, a simple display may not be configured to present visual information via a combination of illumination signals emitted by multiple elements of the simple display concurrently. For example, a simple display may not be configured to present an image captured by the recording device or another recording device. In embodiments, a display may comprise a status display configured to display one or more indications of a status of the recording device. The status may include a mode of operation of the recording device, an amount of power remaining in a battery or other power supply of the recording device, and/or a strength of connection to a wireless network. A simple display may comprise a status display according to various aspects of the present disclosure. A simple display may comprise a non-video display. The non-video display may be precluded from displaying video information in accordance with one or more technical properties of the non-video display. For example, the non-video display may lack pixels for displaying image data captured by the recording device and/or otherwise lack a minimum resolution necessary for displaying image data captured by the camera.

In various embodiments, a recording device may comprise a first display and a second display. The first display may provide information independent of the second display. The second display may provide information independent of the first display. The first display and the second display may provide different information. The first display and the second display may provide unrelated information. For example, the first display may provide first information that is different and/or unrelated from second information provided by the second display. The first display may be oriented in a different direction (e.g., aimed at a different point, etc.) than the second display. For example, the first display may be oriented in a first direction, the second display may be oriented in a second direction, and the first direction may be different than the second direction.

In various embodiments, recording device 110 may comprise a first display, such as first display 118-1 and a second display, such as second display 118-2. First display 118-1 may be oriented in a same direction as lens 115 and field of view 116. First display 118-1 may be viewable by other persons near recording device 110, such as suspect 140. In accordance with recording device 110 being worn by an incident responder, a housing of recording device 110 may obstruct first display 118-1 from view by police officer 120. First display 118-1 may comprise an indicator. First display 118-1 may provide information, such as a recording status of recording device 110, to a person other than the incident responder, such as suspect 140. For example, first display 118-1 may comprise an LED, wherein a color of the LED, and/or illumination pattern of the LED may indicate the recording status of recording device 110. For example, the color red may correspond with a recording mode and the color green may correspond with a standby mode. As another example, a flashing (e.g., blinking) LED may correspond with the recording mode, and a constantly illuminated LED may correspond with the standby mode. Adjusting a brightness of an obstructed display, such as first display 118-1 provides a particular technical benefit for body worn cameras. Particularly, the brightness of the display is adjusted in a manner that would not be perceivable by a wearer of the recording device 110. The adjustment would impact perception of a display in a direction away from a wearer of the recording device 110, rather than the wearer themselves.

In various embodiments, second display 118-2 may be oriented in a different direction as lens 115. For example, second display 118-2 may be oriented such that a housing of recording device 110 does not obstruct second display 118-2 from police officer 120. A housing of recording device 110 may obstruct second display 118-2 from suspect 140. Second display 118-2 may be oriented perpendicular to first display 118-1. Second display 118-2 may comprise a screen. Second display 118-2 may be configured to provide information, such as a remaining battery capacity of recording device 110. For example, second display 118-2 may comprise an LCD display capable of displaying textual, non-textual, and/or symbolic information. Alternately or additionally, second display 118-2 may comprise a low-resolution screen. A resolution of second display 118-2 may be less than 0.2 megapixels or less than 0.1 megapixels. The resolution may be less than a resolution of video data captured by the recording device. For example, a resolution of video data captured via an image sensor of recording device 110 of field of view 116 may be more than 0.3 megapixels, more than 1.0 megapixels, or more than 2.0 megapixels. A size of the second display may be less than 1.0 inches in height. The size may be alternately or additionally less than 1.0 inches or less than 0.5 inches in height. Adjusting a brightness of such a display, such as second display 118-1 provides a particular technical benefit for body worn cameras. For example, the brightness of the display is adjusted for non-video information. Further, and in various embodiments, the brightness is adjusted in accordance with an ambient light level detected in a different direction from that in which the adjusted display may be oriented. Also, the brightness may be adapted independent of a recording state of such a camera. The brightness may be adjusted regardless of whether the camera is buffering or storing video information. By adjusting the brightness of the display, the display may be less likely to distract or otherwise interfere with actions performed by a user an at event, thereby enabling the user to focus on the event, rather than operating recording device 110. By adjusting brightness, power otherwise required to operate the display may be preserved, which may provide a particular benefit for body-worn cameras, where mere use of a display during an event may be optional and unnecessary for performing operation(s) of the camera to record video data.

In various embodiments, the first display may provide information at least partially the same as information provided by the second display. For example, each of the first display and the second display may provide the same information in different directions. The first display may provide information partially different than information provided by the second display. For example, the first display may provide information not provided by the second display. The first display and the second display may comprise the same display. For example, the first display and the second display may comprise a same display (e.g., a flexible OLED display) shaped such that a first portion of the AMOLED display points in a first direction, and a second portion of the AMOLED display points in a second direction that is different than the first direction. In other embodiments, the first display and the second display comprise respective discrete, separate displays which may or may not comprise a different type of display and/or may or may not provide at least partially different information.

In various embodiments, a brightness of a display of a recording device may be adapted in accordance with a detected ambient light level of the scene. For example, recording device 110 may comprise an ambient light detector, such as ambient light detector 114. Ambient light detector 114 may be pointed in a same direction as lens 115 and/or first display 118-1. Ambient light detector 114 may be configured to detect a value corresponding with an ambient light level of scene 130. In accordance with the detected value, a brightness of first display 118-1 and/or second display 118-2 may be modified (e.g., increased, raised, decreased, reduced, lowered, etc.) In various embodiments, a brightness of one or more displays, at least one of which points in a different direction than the ambient light detector may be modified responsive to detecting a value corresponding with an ambient light level. For example, responsive to detecting a first ambient light level of scene 130, a brightness of at least second display 118-2 may be modified.

Figure 2:
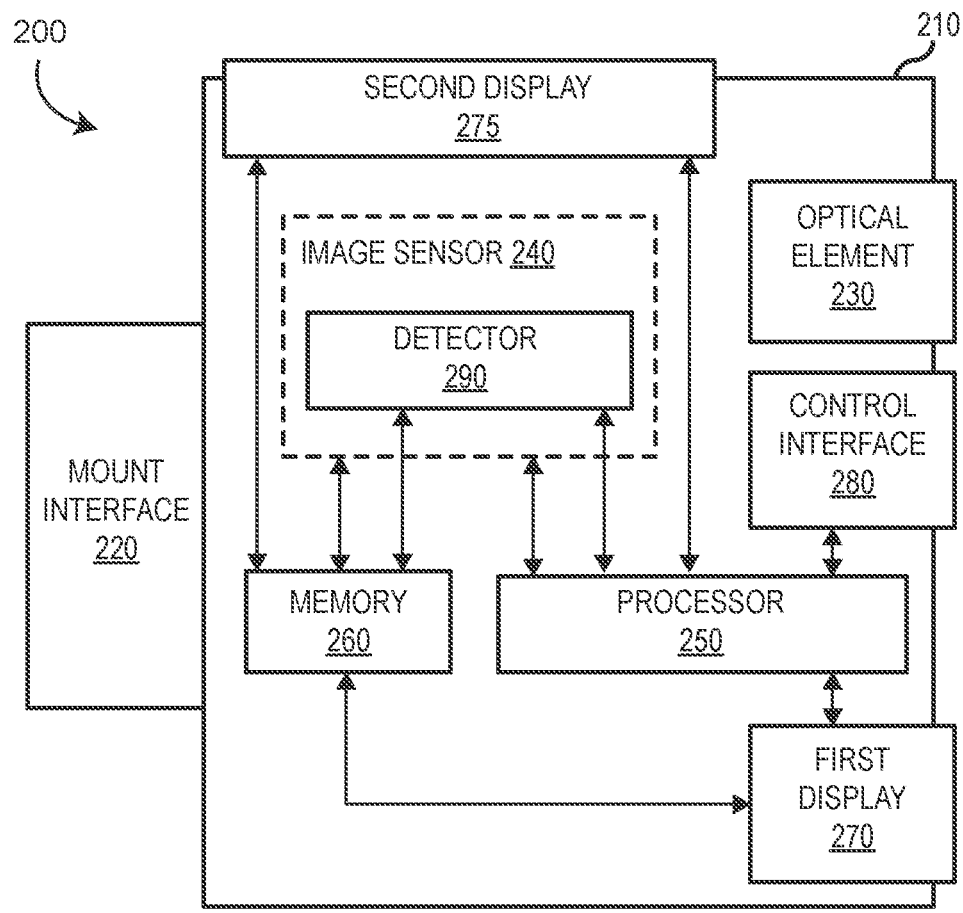
FIG. 2 is a block diagram of an imaging device in accordance with various embodiments described herein.

In various embodiments, and with reference to FIGS. 2A-2C, a recording device 200 is disclosed. Recording device 200 may be similar to, or share similar aspects or components with, the recording devices previously disclosed herein (e.g., recording device 110, etc.). Recording device 200 may comprise any suitable device configured to capture incident information. For example, recording device 200 may comprise a body-worn camera, a smart phone, an in-car camera, or the like.

Recording device 200 may comprise a body 210 (e.g., housing) defining an outer surface of recording device 200. Body 210 may comprise mechanical features configured to couple recording device 200 to a surface. Body 210 may be configured to couple (e.g., mount) to a user. For example, the mechanical features may be configured to interface with an article of clothing or a mount assembly on a user. Body 210 may mount to a location on the user (e.g., a mount location, a second location, etc.). For example, body 210 may mount to a belt mount, a chest mount, or a shoulder mount on the user. In response to being mounted to the location on the user, recording device 200 may be positioned to capture incident information at a fixed position relative to the user. In other embodiments, body 210 may also be configured to mount on or in a vehicle or similar platform. For example, body 210 may comprise a mount interface, such as mount interface 220. Mount interface 220 may extend from body 210 and be configured to couple with a mount, such as mount 450 (with brief reference to FIG. 4). Mount interface 220 may comprise a bayonet connector (e.g., T-connector, male connector, etc.) configured to couple with a complementary connector.

In various embodiments, body 210 may be configured to house (fully and/or at least partially) various mechanical, electrical, and/or electronic components configured to aid in performing the functions of recording device 200. For example, and in accordance with various embodiments, body 210 may be configured to house (fully and/or at least partially) an optical element 230, an image sensor 240, a processor 250, a memory 260, a first display 270, a second display 275, a control interface 280, and/or an ambient light detector 290. As a further example, and in accordance with various embodiments, the body may be configured to house various internal electronic components such as a processor, a memory, a network interface, a power supply, an image sensor, and/or the like.

In various embodiments, optical element 230 may comprise a lens and/or lens assembly configured to focus light onto image sensor 240 for detection. A portion of optical element 230 (e.g., a lens, a bezel, a lens barrel, etc.) may extend through body 210. Body 210 may house a portion of optical element 230. Optical element 230 may be disposed adjacent image sensor 240. Optical element 230 may comprise optical materials, such as low dispersion materials, glass materials, plastic materials, etc.

In various embodiments, image sensor 240 may be configured to detect (e.g., generate, capture, etc.) raw (e.g., sensor) image data from light. Image sensor 240 may capture image data continuously as sequential frames. The sequential frames may be presented serially to provide video data. Image sensor 240 may comprise a charge-coupled device (CCD), a complementary metal-oxide sensor (CMOS), or any other sensor suitable of detecting raw image data from light. Image sensor 240 may be configured to detect visible light and/or near-infrared light. Image sensor 240 may comprise a color filter array (e.g., color filter stack) configured to filter particular wavelengths of light to corresponding sites of a pixel array of image sensor 240. For example, image sensor 240 may comprise a Bayer-filter comprising red, green, and blue (RGB) color filters that filter visible wavelengths of light to specific pixels of the pixel array for image detection. As a further example, image sensor 240 may comprise a sensor sensitive to red, green, blue, and infrared light, such as an RGB-IR sensor. An RGB-IR sensor may comprise red, green, blue, and infrared color filters configured to filter visible and infrared light to specific pixels of a pixel array for image detection.

In various embodiments, image sensor 240 may be configured to capture an image or series of images (e.g., video). For example, during an incident recording image sensor 240 may be configured to capture an image or series of images of the incident recording. Image sensor 240 may be in electric and/or electronic communication with processor 250, memory 260, and/or ambient light detector 290. Image sensor 240 may receive instructions from processor 250, and/or provide signals corresponding with data detected by image sensor 240 to processor 250. As another example, image sensor 240 may provide analog data or digital data corresponding with light detected by image sensor 240 to memory 260. Processor 250 may control (e.g., instruct) image sensor 240 to begin capturing images and to end capturing of the images. Processor 250 may also control (e.g., instruct) image sensor 240 to transmit the captured images to memory 260 for storage. Image sensor 240 may transmit (e.g., stream) the captured images to memory 260 as the images are captured or in response to image sensor 240 ending capturing of the images.

In various embodiments, processor 250 may comprise any circuitry, electrical components, electronic components, software, and/or the like configured to perform various operations and functions discussed herein. For example, processor 250 may comprise a processing circuit, a processor, a digital signal processor, a microcontroller, a microprocessor, an application specific integrated circuit (ASIC), a programmable logic device, logic circuitry, state machines, MEMS devices, signal conditioning circuitry, communication circuitry, a computer, a computer-based system, a radio, a network appliance, a data bus, an address bus, and/or any combination thereof. In various embodiments, processor 250 may include passive electronic devices (e.g., resistors, capacitors, inductors, etc.) and/or active electronic devices (e.g., op amps, comparators, analog-to-digital converters, digital-to-analog converters, programmable logic, SRCs, transistors, etc.). In various embodiments, processor 250 may include data buses, output ports, input ports, timers, memory, arithmetic units, and/or the like.

In various embodiments, processor 250 may be configured to provide and/or receive electrical signals whether digital and/or analog in form. Processor 250 may provide and/or receive digital information via a data bus using any protocol. Processor 250 may receive information, manipulate the received information, and provide the manipulated information. Processor 250 may store information and retrieve stored information. Information received, stored, and/or manipulated by processor 250 may be used to perform a function, control a function, and/or to perform an operation or execute a stored program. Processor 250 may control the operation and/or function of other circuits and/or components of recording device 200. Processor 250 may receive status information regarding the operation of other components, perform calculations with respect to the status information, and provide commands (e.g., instructions) to one or more other components. Processor 250 may command another component to start operation, continue operation, alter operation, suspend operation, cease operation, or the like. Commands and/or status may be communicated between processor 250 and other circuits and/or components via any type of bus (e.g., SPI bus) including any type of data/address bus. In various embodiments, processor 250 may be in electrical, electronic, and/or mechanical communication with one or more components of recording device 200. For example, processor 250 may be in communication with memory 260, the network interface, the power supply, image sensor 240, first display 270, second display 275, control interface 280, ambient light detector 290, and/or the like.

In various embodiments, memory 260 may comprise one or more memory, data structures, or the like configured to store data, programs, and/or instructions. The memory may be in electrical and/or electronic communication with processor, the network interface, the image sensor 240, first display 270, second display 275, and/or any other suitable component of the recording device.

In various embodiments, memory 260 may comprise a tangible, non-transitory computer-readable memory. Instructions stored on the tangible non-transitory memory may allow the processor to perform various operations, functions, and/or steps, as described herein. For example, in response to processor 250 executing the instructions on the memory 260, processor 250 may communicate with image sensor 240 to capture image data, end capturing of the image data, and/or the like, as discussed further herein. As a further example, in response to processor 250 executing instructions on memory 260, processor 250 may communicate with first display 270 and/or second display 275 to provide visual information as discussed herein. As another example, in response to processor 250 cooperating with ambient light detector 290 and/or image sensor 240, processor 250 may modify a brightness of first display 270 and/or second display 275. Processor 250 may execute instructions in response to operation of control interface 280, as discussed further herein. In embodiments, memory 260 may also be configured to receive, store, and maintain incident recordings, including captured image data. In that regard, memory 260 may include a storage medium, data structure, database, memory unit, hard-disk drive (HDD), solid state drive (SSD), removable memory, and/or the like.

In various embodiments, the power supply (e.g., power source) may be configured to provide power to one or more electric and/or electronic components of the recording device. The power supply may provide energy for operating electronic and/or electrical components (e.g., parts, subsystems, circuits, etc.). The power supply may provide electrical power. The power supply may include a battery. The energy of the power supply may be renewable or exhaustible, and/or replaceable. For example, the power supply may comprise one or more rechargeable or disposable batteries.

In various embodiments, provision of power from the power supply may be controlled by processor 250. Processor 250 may monitor and/or record a power level or remaining power of the power supply. Processor 250 may compare the power level or the remaining power of the power supply to a power threshold, and perform one or more operations based on the comparison. For example, in response to the power supply having a low power level or remaining power, processor 250 may instruct various components of recording device 200 to enter a low power mode. Alternatively, processor 250 may instruct the power supply to cease providing power to the various components of recording device 200. In various embodiments, in response to the remaining power being less than or equal to the power threshold, processor 250 may decrease a brightness of one or more displays (e.g., first display 270, second display 275, etc. The power threshold may comprise any suitable and/or desired battery level (e.g., 10%, 20%, etc.).

In various embodiments, first display 270 and/or second display 275 may be configured to visually display data regarding recording device 200 and/or an incident recording. First display 270/second display 275 may comprise a display as previously described herein. For example, first display 270/second display 275 comprise an LCD screen, output device, or the like configured to visually display data. Operation of first display 270/second display 275 may be at least partially controlled by processor 250. For example, first display 270/second display 275 may be configured to display data such as a recording device battery level, a date, a time, an incident recording status (e.g., recording, paused, etc.), an incident recording length (e.g., an elapsed time of the incident recording), an incident recording start time, or the like.

In various embodiments, control interface 280 may be configured to enable a user to interact with recording device 200. For example, control interface 280 may be configured to enable the user to control operation of recording device 200, including starting and stopping recording of image data. Control interface 280 may be in electrical, electronic, and/or mechanical communication with the processor.

Control interface 280 may comprise any suitable hardware, software, mechanical, and/or electronic components configured to enable the user interaction. For example, and in accordance with various embodiments, control interface 280 may comprise a button, switch, or the like. In that regard, control interface 280 may be configured to move, slide, rotate, or otherwise become physically depressed or translated upon application of physical contact. As a further example, and in accordance with various embodiments, control interface 280 may comprise a touchscreen or similar interface enabling user input. As a further example, and in accordance with various embodiments, control interface 280 may include voice control technology. In that regard, control interface 280 may at least partially integrate with an audio capturing system to receive voice commands (e.g., "Record", "Stop Record", "Capture Image", "Record Audio", etc.). Voice command technology is well known in the art, and control interface 280 may implement any suitable voice command technology.

In various embodiments, in response to control interface 280 receiving an activation event (e.g., physically activation, voice activation, touch-screen selection or activation, etc.), processor 250 may be configured to perform various operations including starting and/or stopping an incident recording, controlling operation of image sensor 240, setting brightness of first display 270, setting brightness of second display 275, and/or the like, as discussed further herein. For example, in response to control interface 280 of recording device 200 receiving the activation event, processor 250 may determine or detect the activation event and instruct image sensor 240 to capture an image or series of images. Processor 250 may also instruct first display 270 and/or second display 275 to increase or decrease brightness in accordance with an ambient light value detected by image sensor 240 and/or ambient light detector 290. Processor 250 may be configured to adjust a brightness of first display 270 and/or second display 275 responsive to receiving a value detected by image sensor 240 and/or ambient light detector 290 corresponding with the ambient light level.

In various embodiments, control interface 280 may include an authorization control configured to control access and operation of recording device 200. For example, control interface 280 may comprise a biometric authorization control, such as a fingerprint reader, configured to control access and operation of recording device 200. Authorization controls and biometric authorization controls are well known in the art, and control interface 280 may implement any suitable authorization control technology and/or biometric authorization technology.

In various embodiments, recording device 200 may comprise ambient light detector 290. Ambient light detector 290 may be configured to detect a value corresponding with an ambient light condition. Ambient light detector 290 may comprise a sensor, such as a photodetector configured to detect an amount (e.g., power, intensity, illuminance, etc.) of available ambient light. Ambient light detector 290 may detect the amount converting photons into electrical current. Ambient light detector 290 may comprise devices such as photoresistors (e.g., cadmium sulfide photocells, cadmium selenium photocells, etc.), photodiodes, phototransistors, etc. Ambient light detector 290 may comprise photoelectric sensors, semiconductor sensors, photovoltaic cells, thermal sensors, photochemical sensors, or any other suitable sensor configured to detect available light. Ambient light detector 290 may be electrically and/or electronically coupled to processor 250. Ambient light detector 290 may report a value corresponding with an ambient light level to processor 250. Ambient light detector 290 may be separate from other sensors of recording device 200, such as image sensor 240.

In various embodiments, image sensor 240 may comprise ambient light detector 290. Ambient light detector 290 may be integrated into image sensor 240. Image sensor 240 may perform functions of ambient light sensor 290. Image sensor 240 may report a value corresponding with an ambient light level to processor 250.

In embodiments, recording device 200 may operate in different modes or operating states. Processor 250 may be communicatively coupled to one or more other components to control the components to perform one or more operations associated with the different modes. For example, the different modes may comprise a pre-event mode, an event mode, a stealth mode, and a display status mode.

In embodiments, a pre-event mode may enable information to be captured before indication of an incident is provided to recording device 200. In the pre-event mode, processor 250 may control image sensor 240 to capture video information. The video information may be buffered as video data in memory 260. In accordance with pre-event mode, the video information may be temporarily stored in memory 260. The video information may be buffered in a circular buffer. The video information may be buffered in a first-in-first-out basis. An amount of the video information buffered may be limited in accordance with a maximum buffer size and/or time. When the maximum buffer size has been buffered or the maximum buffer time has been exceeded, oldest stored video information may be deleted, overwritten, or otherwise rendered inaccessible in memory 260. For example, oldest buffered video data may be overwritten with newer video data corresponding to most recently captured video information. New video data may be continuously buffered in accordance with the pre-event mode. Oldest video data may be continuously rendered inaccessible in accordance with the pre-event mode. In accordance with the pre-event mode, detector 290 may detect an ambient light level. In accordance with the pre-event mode, information indicating the pre-event mode may be provided via one or more of second display 270 or first display 275. For example, second display 275 may display a graphical icon indicative of the pre-event mode. First display 270 may provide an illumination signal indicative of the pre-event mode. For example, the illumination signal may comprise a first color being displayed via an LED of first display 270. Alternately or additionally, the illumination signal may comprise a first pattern associated with the pre-event mode. For example, an LED of first display may display a steady or continuous illumination signal in accordance with the pre-event mode. In embodiments, recording device 200 may enter pre-event mode in accordance with an input received via control interface 280.

In embodiments, an event mode may enable information to be captured after indication of an incident is provided to recording device 200. Recording device 200 may receive the indication of the event and enter the event mode responsive to the indication. Recording device 200 may enter (e.g., change from another mode, begin operating in, etc.) the event mode from the pre-event mode. Recording device may operate in the event mode prior to operating in the pre-event mode and/or after operating in the pre-event mode. In the event mode, processor 250 may control image sensor 240 to capture video information. The video information may be further stored as video data in memory 260. In accordance with the event mode, the video information may be stored in non-volatile memory of memory 260. The video information may be non-temporarily stored. The video information may preserve video information associated with the incident until another indication is received that indicates that video information should no longer be captured for the incident. The video information stored in accordance with an event mode may be prevented from being automatically overwritten, including after a period of time. The duration of the video information may be limited by a size of memory 260 or an amount of power in power supply of recording device 200, rather than a pre-determined limit as provided for a pre-event mode. In accordance with the event mode, detector 290 may detect an ambient light level. The ambient light level may be detected independent of a pre-event mode and an event mode. The ambient light level may be detected during both a pre-event mode and an event mode. In accordance with the event mode, information indicating the event mode may be provided via one or more of second display 270 or first display 275. For example, second display 275 may display a graphical icon indicative of the event mode. The icon may be different from a first icon provided for a pre-event mode. First display 270 may provide another illumination signal indicative of the event mode. For example, the illumination signal may comprise a second color being displayed via an LED of first display 270. The second color (e.g., red) may be different from a first color (e.g., green) associated with a pre-event mode of the recording device 200. Alternately or additionally, the illumination signal may comprise a second pattern associated with the event mode. For example, an LED of first display may display an intermittent illumination signal in accordance with the event mode. The second pattern (e.g., blinking) may be different from a first pattern (e.g., steady) associated with a pre-event mode of the recording device 200. In embodiments, recording device 200 may enter event mode in accordance with an indication of an incident being received via control interface 280. In embodiments, a brightness of one or more of first display 270 or second display 275 may be automatically adjusted in accordance with an event mode, pre-event mode, or both an event mode and a pre-event mode of recording device 200. Accordingly, the automatic adjustment may apply to the pre-event mode and not the event mode, the event mode and not the pre-event mode, or both the pre-event mode and the event mode according to various aspects of the present disclosure.

In a stealth mode, displays of a recording device may be disabled. The stealth mode may disable the displays to prevent distraction or decrease visibility of recording device 200 in an environment. In accordance with a stealth mode, processor 250 may disable first display 270 and second display 275. Disabling the displays 270,275 may comprise one or more of removing power from the displays and/or preventing information from being provided from the displays 270,275. In embodiments, stealth mode may be applied or entered by recording device 200 concurrently with a pre-event mode and event mode of recording device 200. Rather than providing information associated with one or more of these modes, the display(s) of recording device 200 may be disabled. Accordingly, the stealth mode may supersede the event mode or pre-event mode with regarding to an operation performed otherwise performed via one or more displays of the recording device.

In a discrete mode, a front display of a recording device may be disabled. The discrete mode may disable the front display to decrease visibility of recording device 200 or prevent distraction otherwise caused by the display in an environment near recording device 200. In the discrete mode, a top or second display may remain operational. Accordingly, a wearer of recording device 200 may still be able to receive information from the recording device 200 via the top display. In accordance with discrete mode, processor 250 may disable first display 270. In accordance with discrete mode, processor 250 may provide information via second display 275. In accordance with discrete mode, processor 250 may continuously provide information via second display 275, independent of first display 270 being disabled. Disabling the display 270 may comprise one or more of removing power from the display 270 and/or preventing information from being provided from display 270. In embodiments, display status mode may be applied or entered by recording device 200 concurrently with a pre-event mode and event mode of recording device 200. Rather than providing information associated with one or more of these modes, the display(s) of recording device 200 may be disabled. Accordingly, the discrete mode may supersede the event mode or pre-event mode with regarding to an operation performed otherwise performed via one or more displays of the recording device. The discrete mode may be entered or applied via recording device 200 separately from the stealth mode.

In embodiments, recording device 200 may further comprise a normal mode. In a normal mode, each of the one or more displays of recording device 200 may be activated. For example, each of first display 270 and second display 275 may provide information in accordance with a normal mode of recording device 200 as controlled by processor 250. Normal mode may be entered when neither stealth mode nor discrete mode are applied. Accordingly, recording device may be provide in one of a normal mode, stealth mode, or discrete mode according to various aspects of the present disclosure. Information provided, if any, in accordance with such modes may be further provided in accordance with a pre-event mode or recording mode concurrently performed by (e.g., applied to, implemented by, etc.) recording device 200.

In various embodiments, and with reference to FIGS. 3A-3C, a recording device 300 is disclosed. Recording device 300 may be similar to, or share similar aspects or components with the recording devices discussed previously herein (e.g., recording device 200, recording device 100, etc.). One or more elements or features of recording device 300 may correspond with one or more elements or features of recording device 100/200.

Referring to FIG. 3A, recording device 300 may comprise a body 310. Body 310 may comprise a first end 312 (e.g., front end, front, etc.) and a second end 314 (e.g., a back end, rear end, back, etc.). First end 312 may be opposite second end 314. Body 310 may comprise a third end 316 (e.g., top end, top, etc.) and a fourth end 318 (e.g., bottom end, bottom, etc.). Third end 316 may be opposite fourth end 318. Third end 316 may connect first end 312 and second end 314. Fourth end 218 may connect first end 312 and second end 314. First end 312 may connect third end 316 and fourth end 318. Second end 314 may connect third end 316 and fourth end 318.

In various embodiments, recording device 300 may comprise a mount interface, such as mount interface 320. Mount interface 320 may extend from second end 314. Mount interface 320 may be configured to couple to a provided mount (e.g., mount 450 with brief reference to FIG. 4). Recording device 300 may be configured to releasably couple to a provided mount via mount interface 320. Mount interface 320 may include a connector, such as a bayonet style connector. Mount interface 320 may include a receiver, such as a female receiver. Mount interface 320 may oppose optical element 330, first display 370, and/or ambient light detector 390 as discussed further herein.

In various embodiments, and with reference to FIG. 3B, body 310 may be configured to house (fully and/or at least partially) various mechanical, electrical, and/or electronic components configured to aid in performing the functions of recording device 300. For example, and in accordance with various embodiments, body 310 may be configured to house (fully and/or at least partially) optical element 330, first display 370, second display 375, control interface 380 an image sensor, and/or ambient light detector 290.

In various embodiments, optical element 330 may be disposed on first end 312 of housing 310. Optical element 330 may extend through an aperture (e.g., opening, etc.) on housing 310. Optical element 330 may oppose mount interface 320. Optical element 330 may comprise an optical axis, such as optical axis 335. Optical element 330 may be symmetric about optical axis 335. Optical axis 335 may comprise an axis of revolution of optical element 330. Optical element 330 may be oriented along optical axis 335. Optical axis 335 may be perpendicular to first end 312 and/or second end 314. Optical axis 335 may be parallel to third end 316 and/or fourth end 318. Optical element 330 may be disposed proximate fourth end 318. Optical axis 330 may be perpendicular to first display 370 and/or parallel with second display 375.

In various embodiments, recording device 300 may comprise an image sensor as previously described herein. The image sensor may be coincident with a sensor plane (e.g., imaging plane, etc.) on which optical element 330 is configured to focus light. For example, the image sensor may be coincident with a sensor plane 345. Sensor plane 345 may be perpendicular to optical axis 335. Sensor plane 345 may be parallel to first end 312 and/or second end 314. Sensor plane 345 may be perpendicular to third end 316 and/or fourth end 318. Sensor plane 345 may be disposed between mount interface 320 and optical element 330. Sensor plane 345 may be disposed first end 312 and second end 314. Sensor plane 345 may be parallel with first display 370 and/or perpendicular to second display 375.

In various embodiments, control interface 380 may be disposed on first end 312 of housing 310. Control interface 380 may comprise a switch. For example, control interface 380 may comprise a push button switch. Control interface 380 may be disposed proximate third end 316. Control interface 380 may comprise first display 370.

In various embodiments, first display 370 may be disposed on control interface 380. First display 370 may be disposed on first end 312. First display may comprise one or more indicators. For example, first display 370 may comprise a first indicator 370-1, a second indicator 370-2, and a third indicator 370-3. Each of the indicators may be configured to provide non-textual information regarding a status of recording device 300. First display 370 may provide (e.g., present, display, project, etc.) visual information in a direction along optical axis 335, along which optical element 330 is directed. A processor of recording device 300 may control first display 370 such that a brightness of first display 370 corresponds with an ambient light level of a scene at which optical element 330 is directed.

In various embodiments, second display 375 may be disposed orthogonal to first display 370. Second display 375 may be disposed on third end 316 or fourth end 318. Second display 375 may be configured to provide textual information. For example, second display 375 may comprise a screen. The screen may be facing a different direction than first display 370. For example, the screen may be oriented upward, such that a user of recording device 300 may view information pertaining to recording device 300. A processor of recording device 300 may control second display 375 such that a brightness of second display 375 corresponds with an ambient light level of a scene at which optical element 330 is directed.

In various embodiments, recording device 300 may comprise a discrete ambient light detector, such as ambient light detector 390. Ambient light detector 390 may be disposed on first end 312. Ambient light detector 390 may be disposed between optical element 330 and control interface 380. Ambient light detector 390 may be aimed in a same direction as optical element 330 and/or first display 370. Ambient light detector 390 may be opposite mount interface 320. Ambient light detector 370 may be aimed along optical axis 335.

Figure 4:
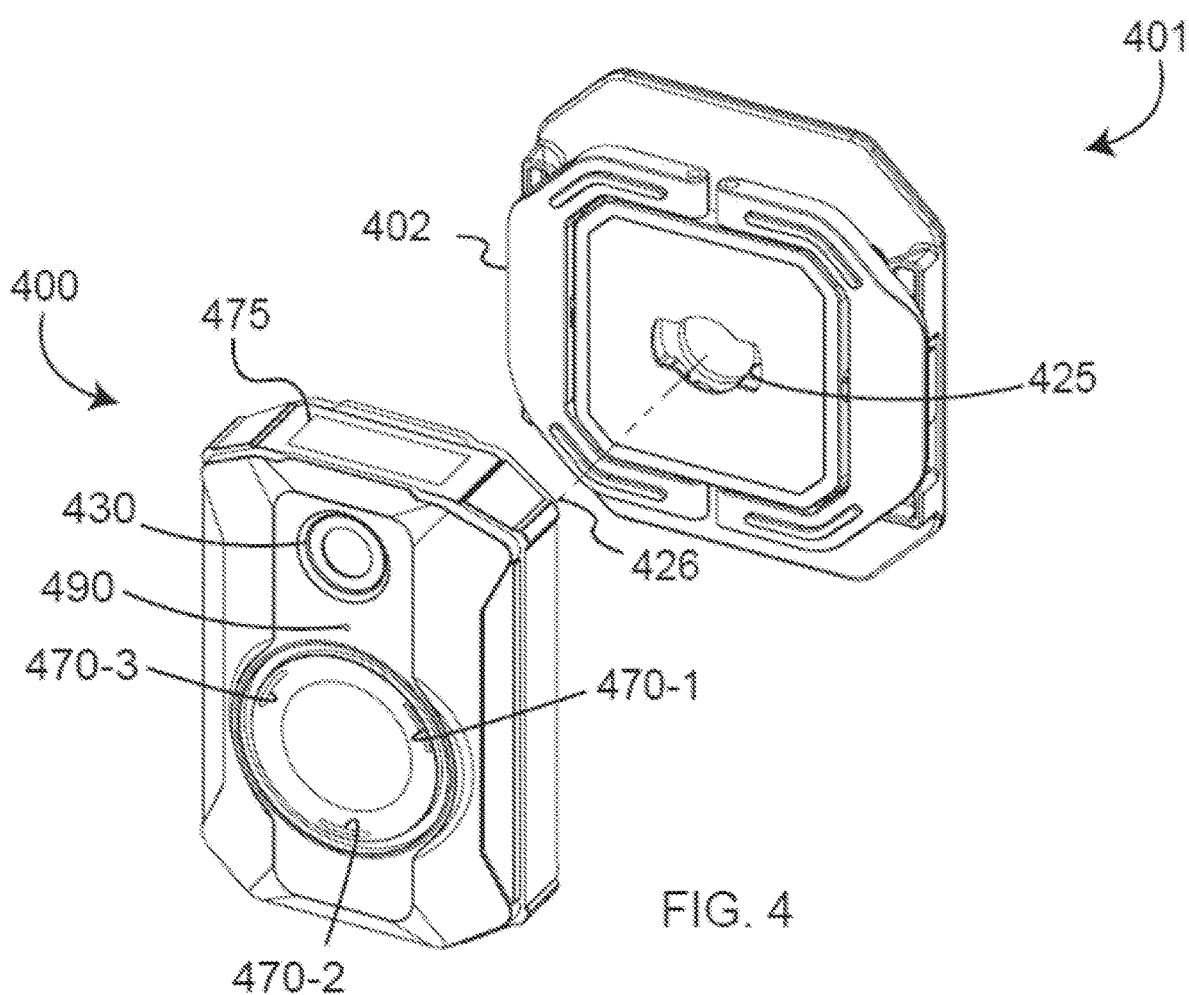
FIG. 4 is a perspective view of a system comprising an imaging device and a mount in accordance with various embodiments described herein.

In various embodiments, and with reference to FIG. 4, a recording system 401 is disclosed. Recording system 401 may comprise a recording device 400 and a mount 402. Recording device 400 may be similar to, or share similar aspects or components with the recording devices discussed previously herein (e.g., recording device 300, recording device 200, recording device 100, etc.). One or more elements or features of recording device 400 may correspond with one or more elements or features of recording device 100/200/300.

Referring to FIG. 4, an exploded view of recording system 401 is shown. Recording device 400 may be configured to couple with mount 402. Recording device 400 may be configured to engage mount 402 in a direction along mounting axis 426. Recording device 400 may comprise a first mount interface (e.g., mount interface 320) configured to couple with a second mount interface of mount 402, such as second mount interface 425. Mount 402 may be coupled to an article of wear, such as an officer's uniform, thereby enabling recording device to be worn. An optical element 430, ambient light detector 490, first indicator 470-1, second indicator 470-2, and/or third indicator 470-3 may be aimed along mount axis 426 and/or oppose mount 402. Second display 475 may be aimed perpendicular to mount axis 426.

Figure 5:
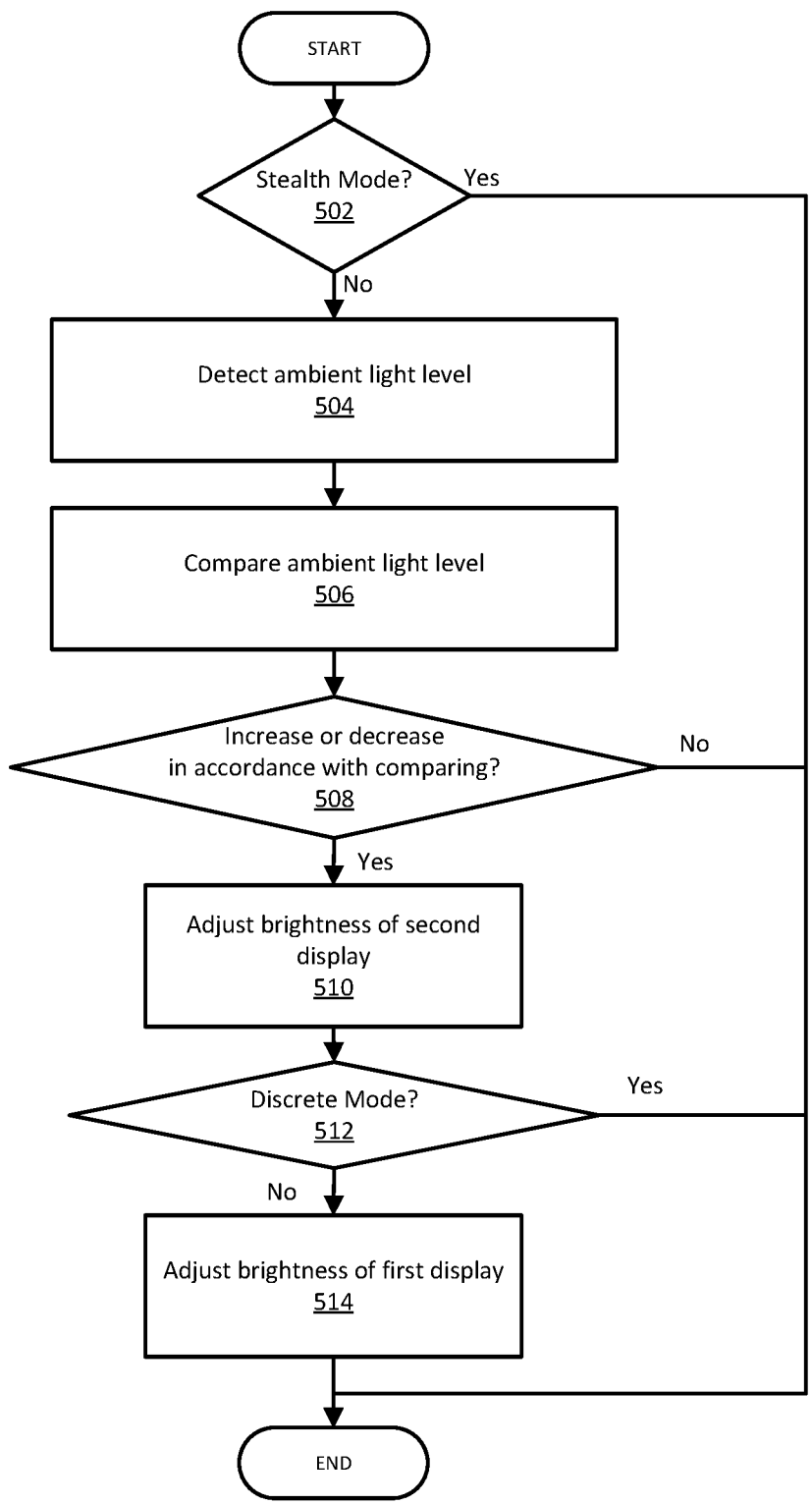
FIG. 5 illustrates a process flow for a method of providing adaptive display brightness by an imaging device in accordance with various embodiments described herein.

In embodiments, a method performed by a recording device to adaptively control display brightness is provided. An embodiment of a method 500 comprising one or more operations for a recording device to adaptively control display brightness is depicted in FIG. 5. The one or more operations may be performed by a processor of the recording device. The recording device may comprise executable instructions stored in non-transitory memory that, when executed by the processor, cause the processor or recording device to perform the one or more operations. The method may be performed by a recording device disclosed herein, including one or more of recording device 100, recording device 200, recording device 300, and/or recording device 400 in embodiments according to various aspects of the present disclosure. In embodiment, adaptively controlling a display may comprise one or more of determining whether a stealth mode is applied 502, detecting an ambient light level 504, comparing an ambient light level 506, and controlling a brightness of at least one display of the recording device in accordance with the comparing. In embodiments, the controlling may comprise one or more of determining whether to increase or decrease a brightness in accordance with the comparing 508, adjusting the brightness of a second display 510, determining whether a discrete mode is applied 512, and/or adjusting a brightness of a first display 514. In embodiments, one or more operations of method 500 may be repeatedly (e.g., frequently, at a predetermined frequency, etc.) performed to adaptively control display brightness over time. Embodiments according to various aspects of the present disclosure may comprise repeated performance of one or more operations of method 500, including those in which different operations are performed by the recording device. For example, a first iteration of method 500 may comprise detecting a first ambient light level in a first instance of detecting 504 and decreasing a first brightness of a first display responsive to detecting the first value in a first instance of adjusting 510, while a second iteration of method 500 may comprise detecting a second ambient light level in a second instance of detecting 504 and increasing the first brightness of the first display responsive to detecting the second value in a second instance of adjusting 510.

After starting method 500, determining whether a stealth mode is applied 502 may be performed to determine whether any control relative to an ambient light level should be performed. Determining 502 may comprise performing a determination to determine whether the recording device is disposed in a stealth mode. Determining 502 may comprise determining the stealth mode is performed (e.g., applied, activated, etc.) or not performed (e.g., not applied, deactivated, etc.). For example, processor 250 may read a configuration setting of recording device 200 in memory 260 to determine whether stealth mode is applied. Alternately or additionally, determining 502 may comprise receiving an input via a control interface of the recording device. The input may indicate that the stealth mode is applied or not applied. In accordance with the stealth mode being performed, one or more displays of the recording device may be disabled. In accordance with the stealth mode being performed, display of information from the recording device via the one or more displays may be prevented. Accordingly, and in accordance with the stealth mode being performed, method 500 may end. In accordance with stealth mode being deactivated, one or more additional operations of method 500 may be performed.

In embodiments, detecting an ambient light level 504 may be performed. Detecting 504 may be performed responsive to determining whether stealth mode is applied. In accordance with stealth mode being applied, detecting 504 may be precluded from being performed and power associated with 504 may be preserved by camera. Detecting 504 may comprise obtaining an ambient light level. An ambient light detector may detect a value corresponding with an ambient light level. The ambient light detector may report the value to the processor. In embodiments, the image sensor may comprise one or more of image sensor 240 or ambient light detector 290, 390, 490, with brief reference to FIG. 2-4. Detecting 504, for example, may comprise detecting the ambient light level via the ambient light detector 290. When an ambient light level is detected, one or more further operations of method 500 may be performed. The one or more operations may be performed to control (e.g., controlling) a brightness of at least one display of the recording device in accordance with detecting 504.

In embodiments, and responsive to detecting the ambient light level 504, comparing the ambient light level 506 may be performed. Comparing 506 may be performed by a processor of the recording device. Comparing 506 may comprise comparing a value identifying the ambient light level to one or more reference values. Comparing 506 may comprise performing a comparison between the value and the one or more reference values. The one or more reference values may comprise a threshold value. The one or more reference values may comprise a first threshold value associated with a higher ambient light level. The one or more reference values may comprise a second threshold value associated with a lower ambient light level. The higher ambient light level may be higher (e.g., brighter, have an increased illumination amount, etc.) relative to the lower ambient light level. The first threshold value and the second threshold value may at least partially define three or more ranges of ambient light levels. In embodiments, the one or more reference values may comprise a lookup table of multiple values, wherein comparing the ambient light level comprises identifying a range of ambient light levels in which the detected ambient light level is detected. The range of ambient light levels may be bounded by a first ambient light level that is greater than the detected ambient light level and a second ambient light level that is less than the detected ambient light level.

In embodiments, comparing 506 may comprise identifying a brightness value that corresponds to an ambient light level. Each ambient light level of a plurality of detectable ambient light levels may have a respective, associated brightness value. Brightness values for two different detected ambient light levels may be different in embodiments according to various aspects of the present disclosure. The brightness value that corresponds to an ambient light level may be determined in accordance with one or more comparisons between the ambient light level and the one or more reference values. For example, an ambient light level may be associated with a first brightness value when the level is equal or higher than a threshold reference value. An ambient light level may be associated with a second brightness value when the level is less than a threshold reference value. In embodiments, a different brightness value may be associated with each range of one or more ranges of values defined by the one or more reference values. For example, a first range of ambient light levels may be associated with a first brightness value, a second range of detected ambient light levels may be associated with a second brightness value, and/or a third range of detected ambient light levels may be associated with a third brightness value. The ranges may be non-overlapping and/or each associated with a different brightness value. A number of different brightness values may be less than a number of ambient light levels detected, including, in some embodiments, a number of ambient light levels associated with respective ranges of ambient light levels. In other embodiments, each detected ambient light level may be uniquely correlated with a respective brightness value.

In embodiments, comparing 506 may comprise identifying a first ambient light level. The first ambient light level may be associated with a high ambient light level. The first ambient light level may be associated with an ambient light level greater than a previously detected ambient light level. In embodiments, the first ambient light level may be identified in accordance with the value of the ambient light level being greater than the first threshold value. In embodiments, the first ambient light level may be associated with a first brightness value. The first brightness value may comprise a higher brightness value. When applied to a display, a brightness or amount of light emitted by the display may be increased in accordance with the first brightness value. The brightness may be increased relative to a brightness by which light was emitted from the display in accordance with a brightness value applied to the display prior to the first brightness value being applied.

In embodiments, comparing 506 may comprise identifying a second ambient light level. The second ambient light level may be associated with a low ambient light level. The second ambient light level may be less than the first ambient light level. The second ambient light level may be associated with an ambient light level less than a previously detected ambient light level. In embodiments, the second ambient light level may be identified in accordance with the value of the ambient light level being less than the first threshold value or less than the second threshold value. In embodiments, the second ambient light level may be associated with a second brightness value. The second brightness value may comprise a lower brightness value. The second brightness value may be less than the first brightness value. When applied to a display, a brightness or amount of light emitted by the display may be decrease in accordance with the second brightness value. The brightness may be decreased relative to a brightness by which light was emitted from the display in accordance with a brightness value applied to the display prior to the second brightness value being applied. For example, the previously applied brightness value may comprise the first brightness value disclosed above.

In embodiments, comparing 506 may comprise identifying an equal ambient light level. The equal ambient light level may be equal to a previously detected ambient light level. In embodiments, the equal ambient light level may be identified in accordance with the value of the ambient light level being similarly less than or greater than the first threshold value and/or less than the second threshold value as a previously identified ambient light level. In embodiments, the equal ambient light level may be associated with a same brightness value as the previously identified ambient light level. Identifying an equal ambient light level may comprise identifying a brightness value that equals a currently applied brightness value. When applied to a display, a brightness or amount of light emitted by the display may be unchanged in accordance with the same brightness value. In other embodiments, the same brightness value may not be re-applied to the display and the previously-applied brightness value may be maintained for the display in accordance with various aspects of the present disclosure.

In embodiments, determining whether to increase or decrease a brightness of at least one display 508 may be performed. Determining 508 may be performed responsive to comparing 508. Determining may be performed in accordance with a comparison performed via comparing 506. Determining 508 may comprise comparing a brightness value identified by comparing 506 with a brightness value currently applied to a display. When the identified brightness value equals a currently applied brightness value, a brightness (e.g., brightness value applied to the at least one display) may be maintained. When the identified brightness value is not equal to a currently applied brightness value, determining 508 may comprise determining to increase or decrease a brightness (e.g., brightness value) applied to the at least one display. In some embodiments, determining 508 may include identifying a brightness value associated with a value of an ambient light level, rather than such an operation being included as part of comparing 506. Alternately, comparing 506 and determining 508 may comprise a common, integrated operation or set of operations according to various aspects of the present disclosure.

In embodiments, determining 508 may comprise determining to increase a brightness value of a display 508. Determining 508 to increase may comprise identifying a brightness value greater than a brightness value currently applied to the display. Determining 508 to increase may comprise determining the identified brightness value is higher than a brightness value previously applied to the display. Determining 508 to increase may comprise detecting an ambient light level that is within a higher range of ambient light levels than a previously detected ambient light level. For example, determining to increase may comprise identifying the first ambient light level when the second brightness value is applied to the display. Determining 508 to increase may comprise identifying the first brightness value when the second brightness value was previously applied to the display.

In embodiments, determining 508 may comprise determining to decrease a brightness value of a display. Determining 508 to decrease may comprise identifying a brightness value less than a brightness value currently applied to the display. Determining to decrease may comprise determining the identified brightness value is less than (e.g., associated with a lower amount of emitted light) a brightness value previously applied to the display. Determining to decrease may comprise detecting an ambient light level that is within a lower range of ambient light levels than a previously detected ambient light level. For example, determining to decrease may comprise identifying the second ambient light level when the first brightness value is applied to the display. Determining to decrease may comprise identifying the second brightness value when the first brightness value was previously applied to the display.

In embodiments, comparing 506 may comprise identifying a brightness value for a period of time. The period of time may prevent temporary changes in an ambient light level from causing frequent changes to a brightness value of a display. In some embodiments, the comparing may comprise multiple iterations of method 500 being performed over time, wherein comparing 506 may comprise multiple values detected via detecting 504. The period of time may comprise at least a few seconds. In some embodiments, different brightness values may be associated with different periods of time. For example, a first value or first brightness value associated with a higher ambient light level may be associated with a first period of time and a second value or second brightness value associated with a lower ambient light level may be associated with a second period of time different from the first period of time. The second period of time may be less than (e.g., shorter than) the first period of time. For example, the first period of time may be equal or greater than twenty seconds and the second period of time may be less than five seconds. Accordingly, different periods of time for different brightness values may enable a brightness of a display to be adjusted faster for some of the brightness values relative to others of the brightness values. For example, a brightness may be decreased faster than increased when corresponding lower and higher ambient light levels are detected for same periods of time.

In embodiments, determining 508 may comprise determining to maintain (e.g., not increase or decrease) a brightness value. Determining to maintain may comprise identifying a brightness value less that matches a brightness value currently applied to the display. Determining to maintain may comprise determining the identified brightness value is associated with a same brightness value previously applied to the display. Determining to maintain may comprise detecting an ambient light level that is within a same range of ambient light level as a previously detected ambient light level. For example, determining to decrease may comprise identifying the first ambient light level when the first brightness value is applied to the display. Determining to decrease may comprise identifying the second brightness value when the second brightness value was previously applied to the display. When maintaining the brightness value is determined, method 500 may end. When an increase (e.g., increasing) or a decrease (e.g., decreasing) is determined in accordance with comparing, one or more further operations of method 500 may be performed.

In embodiments, and in accordance with determining 508 to increase or decrease a brightness of a display, adjusting at least one brightness of a display may performed. The adjusting may comprise adjusting the brightness of a second display 510. Adjusting the brightness may comprise applying a determined brightness value to the display. The display may be configured to increase or decrease an amount of light emitted by the display in accordance with a brightness value applied to the display. The brightness value may be applied as a setting to the second display (e.g., second display 275). The brightness of the display may be increased in accordance with the adjusting 510. Adjusting the brightness value may comprise applying a brightness value greater than (e.g., associated with more emitted light) to the display than a previously applied brightness value. The brightness of the display may be decreased in accordance with the adjusting 510. Adjusting the brightness value may comprise applying a brightness value less than (e.g., associated with less emitted light) to the display than a previously applied brightness value.

In embodiments, determining whether a discrete mode is applied 512 may be performed. Determining 512 may comprise performing a determination to determine whether the recording device is disposed in the discrete mode. Determining 512 may comprise determining the discrete mode is performed (e.g., applied, activated, etc.) or not performed (e.g., not applied, deactivated, etc.). For example, processor 250 may read a configuration setting of recording device 200 in memory 260 to determine whether the discrete mode is applied. Alternately or additionally, determining 512 may comprise receiving an input via a control interface of the recording device. The input may indicate that the discrete mode is applied or not applied. In accordance with the discrete mode being performed, one or more additional displays of the recording device may be disabled. In accordance with the discrete mode, display of information from the recording device via the one or more additional displays may be prevented. Accordingly, and in accordance with the discrete mode being performed, method 500 may end. In accordance with discrete mode being deactivated, one or more additional operations of method 500 may be performed. Determining the discrete mode is not applied may comprise determining a normal mode of the recording device is applied.

In embodiments, adjusting at least one brightness of another display may performed. The adjusting may comprise adjusting the brightness of a first display 514. The brightness may be adjusted in accordance with determining to increase or decrease a brightness of a display. The brightness may be adjusted in accordance with determining the discrete mode is not applied (e.g., the recording device is operating in a normal mode and/or not a discrete mode). Adjusting the brightness 514 may comprise applying a determined brightness value to the display. The display may be configured to increase or decrease an amount of light emitted by the display in accordance with a brightness value applied to the display. The brightness value may be applied as a setting to the first display (e.g., first display 270). The brightness of the display may be increased in accordance with the adjusting 514. Adjusting the brightness value may comprise applying a brightness value greater than (e.g., associated with more emitted light) to the display than a previously applied brightness value. The brightness of the display may be decreased in accordance with the adjusting 514. Adjusting the brightness value may comprise applying a brightness value less than (e.g., associated with less emitted light) to the display than a previously applied brightness value. The brightnesses of each of at least two different displays of the recording device may be increased or decreased in accordance with adjusting 514. The processor may modify the brightness of the second display in accordance with the first value detected by the ambient light detector, even though the second display is oriented in a different direction than the first display. The processor may modify the brightness of the second display in accordance with the ambient light level, even though second display is oriented in a different direction than an ambient light detector by which the ambient light level is detected. After adjusting 514, method 500 may end.

In embodiments, adjusting 510 and/or adjusting 514 may be performed independent of an event mode or pre-event mode of the recording device. The adjustment may be applied while the recording device is disposed in the event mode or disposed within the pre-event mode. Accordingly, the adjustment may be performed independent of whether captured video information is concurrently being buffered or stored by the recording device. A first adjustment may be performed concurrently with video data being buffered by the recording device and a second adjustment may be subsequently performed concurrently with video data being stored by the recording device.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosure is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A body-worn camera comprising:
   an optical element, the optical element comprising an optical axis;
   an image sensor, the image sensor configured to detect image data of a scene via the optical element, the image sensor comprising an image plane perpendicular to the optical axis;
   a first display, the first display viewable along the optical axis in a first direction, the first direction oriented toward the image plane and away from the optical element;
   an ambient light sensor, the ambient light sensor configured to detect a value corresponding with an ambient light level of the scene;
   a processing circuit communicably coupled to the image sensor and the ambient light sensor;
   a mount interface integrated with the body-worn camera and configured to couple with a provided mount interface of a provided mount, wherein the first display is integrated on a first side of the body-worn camera opposite a second side of the body-worn camera at which the mount interface is integrated with the body-worn camera;
   a second display, the second display viewable along a first axis perpendicular to the optical axis; and
   a non-transitory computer-readable medium having computer-readable instructions stored thereon that, when executed by the processing circuit, cause the processing circuit to execute operations comprising:
   recording, via the image sensor, the image data;
   detecting, via the ambient light sensor, a first value corresponding with a first ambient light level;
   decreasing a first brightness of the first display responsive to detecting the first value;
   detecting, via the ambient light sensor, a second value corresponding with a second ambient light level, the second ambient light level greater than the first ambient light level;
   increasing the first brightness of the first display responsive to detecting the second value;
   decreasing a second brightness of the second display responsive to detecting the first value; and
   increasing the second brightness of the second display responsive to detecting the second value.

2. The body-worn camera of claim 1, wherein the image sensor comprises the ambient light sensor.

3. The body-worn camera of claim 1, further comprising a housing, wherein the second display is optically obstructed from the optical axis by the housing of the body-worn camera.

4. The body-worn camera of claim 1, wherein the second display is oriented perpendicular to the first display.

5. The body-worn camera of claim 1, wherein the first display comprises an indicator, and wherein the second display comprises a screen.

6. The body-worn camera of claim 1, wherein the image sensor comprises the ambient light sensor and the operations further comprise recording the image data concurrently with detecting the first value.

7. The body-worn camera of claim 1, wherein recording the image data comprises:
   capturing video data;
   buffering a first portion of the video data; and
   storing a second portion of the video data different from the first portion of the video data, wherein the first brightness is decreased concurrently with buffering the first portion of the video data and the first brightness is increased concurrently with storing the second portion of the video data.

8. The body-worn camera of claim 1, wherein:
the first display and the second display comprise respective discrete, separate displays;
the first display and the second display comprise different types of displays; and
the first display and the second display provide at least partially different information.

9. A method performed by a recording device, the method comprising:
detecting an ambient light level via an ambient light detector integrated with the recording device;
adjusting a brightness of at least one non-video display of the recording device in accordance with the ambient light level;
determining the at least one non-video display is disabled;
determining a second ambient light level; and
in accordance with determining the at least one non-video display is disabled, not adjusting the brightness of the at least one non-video display in accordance with the second ambient light level.

10. The method of claim 9, wherein the recording device comprises a body-worn camera.

11. The method of claim 9, wherein the adjusting comprises adjusting the brightness independent of a recording state of the recording device.

12. The method of claim 9, wherein the adjusting comprises adjusting the brightness when the recording device is not storing video data.

13. The method of claim 9, wherein the ambient light detector is oriented in a first direction and the at least one non-video display is oriented in a second direction different from the first direction.

14. The method of claim 9, wherein:
the brightness of the at least one non-video display is adjusted while the recording device is mounted to a location on a user;
the recording device is mounted to the location in a first direction from the recording device; and
the at least one non-video display is oriented in a second direction from the recording device, the second direction opposite the first direction.

15. The method of claim 9, further comprising:
in accordance with a pre-event mode of the recording device, buffering video information captured by the recording device as video data in a memory of the recording device;
in accordance with the pre-event mode, providing a first illumination signal via the at least one non-video display;
in accordance with an indication received by the recording device that indicates an incident, entering an event mode of the recording device;
in accordance with the event mode, storing the video information in the memory; and
in accordance with the event mode, providing a second illumination signal via the at least one non-video display, wherein the second illumination signal is different from the first illumination signal and the brightness of the at least one non-video display is adjusted for each of the first illumination signal and the second illumination signal.

16. A system comprising:
a mount comprising a first mount interface; and
a body-worn camera comprising:
a housing;
a second mount interface integrated on a first side of the housing, the second mount interface configured to couple to the first mount interface in a first direction away from the housing;
an optical element, the optical element comprising an optical axis;
an image sensor, the image sensor configured to generate image data in accordance with visual information captured by the optical element along the optical axis;
a first display integrated on a second side of the housing opposite the first side of the housing, the first display viewable along the optical axis in a second direction away from the housing;
an ambient light sensor, the ambient light sensor configured to detect a value corresponding with an ambient light level;
a processing circuit communicably coupled to the image sensor and the ambient light sensor; and
a non-transitory computer-readable medium having computer-readable instructions stored thereon that, when executed by the processing circuit, cause the processing circuit to execute operations comprising:
recording, via the image sensor, the image data;
detecting, via the ambient light sensor, the value corresponding with the ambient light level; and
adjusting a brightness of the first display in accordance with the ambient light level, wherein the first direction is opposite the second direction and the first display is obstructed from view in the first direction by the housing, and wherein recording the image data comprises:
capturing video information;
buffering a first portion of the video information;
providing a first illumination signal via the first display when the first portion of the video information is buffered;
storing a second portion of the video information different from the first portion of the video information; and
providing a second illumination signal via the first display when the first portion of the video information is stored, wherein the second illumination signal is different from the first illumination signal and adjusting the brightness of the first display comprises adjusting the brightness when the first portion of the video information is buffered and when the second portion of the video information is stored.

17. The system of claim 16, further comprising a second display integrated on a third side of the housing different from the first side of the housing and the second side of the housing, the second display viewable in a third direction away from the housing, wherein:
the third direction is perpendicular to the first direction; and
the operations further comprise adjusting a brightness of the second display in accordance with the ambient light level.

18. The system of claim 17, wherein the first display comprises a light emitting diode.

19. The system of claim 18, wherein a resolution of the second display is less than 0.2 megapixels.

20. The system of claim 16, wherein the image sensor comprises the ambient light sensor and the operations further comprise recording the image data concurrently with detecting the ambient light level.

* * * * *